United States Patent Office 2,989,497
Patented June 20, 1961

2,989,497
ART OF HEAT-STABILIZATION OF POLYVINYL HALIDE RESINS
Richard Milton Lycette, Villa Park, Ill., assignor to Continental Can Company, Inc., New York, N.Y., a corporation of New York
No Drawing. Filed Nov. 25, 1957, Ser. No. 698,327
3 Claims. (Cl. 260—45.8)

This invention relates to resin compositions containing

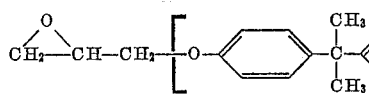

vinyl halide in polymer form, and is characterized by improvement of stability against the chemical breakdown of these resins. This stability is manifested by greatly increased resistance to charring or color degradation upon heating.

It is know that serious primary degradation of a polymer containing vinyl chloride, upon heating, occurs by a partial chemical decomposition and the splitting off of hydrogen chloride from the molecule. The degradation of polyvinyl chloride and related copolymers is a complicated reaction, since in the first stage it is a free radical mechanism and in the later stages an ionic mechanism. Autocatalysis of degradation has been stated to occur by the action of liberated hydrogen chloride, but it is a present belief that hydrogen chloride only enhances degradation when there are present in the system metals which can be converted to metal chlorides. According to this invention, a component is added to the system which can helpfully bind evolved hydrogen chloride. This agent cannot be 100% effective; and thus, some hydrogen chloride will be available to combine with any metals present to form the corresponding metal halides and promote degradation. According to this invention, another agent is also used in conjunction with the acid acceptor, which can couple with or inactivate these same metals and thereby significantly increase the heat stabilization of such films.

Stabilizers are known which are capable of delaying or retarding this primary degradation, many of which are alkaline or basic in nature and serve to neutralize such released acid. Common also to the literature are certain compounds called chelating agents which are able to combine with metal ions to form ring structures in which the metals are very strongly bound.

It has been found that the azo compounds or the epoxides, when used separately, each have a protective effect but do not produce a commercially satisfactory stabilization at desirable higher levels of heat treatment. The combination of such compounds has been found to make it possible to stop vinyl degradation at such elevated temperatures. According to the present invention, the coordinate use of the stabilizers, each in an amount which as a total does not degrade the vinyl resin composition with loss of the vinyl resin properties, leads to a synergistic or cumulative effect, with greatly improved heat stability so that commercially satisfactory results are attained.

Any chemical compound which is a strong hydrochloric acid acceptor, soluble in vinyl resin systems, and stable under the elevated heat treatments is satisfactory. Examples of such compounds are epoxides which have the bisphenol A/epichlorohydrin or the phenol-formaldehyde/epichlorohydrin type configurations. Best results are obtained in the range of 170 to 210 epoxide equivalent weight. Stable epoxide resins of the types, as obtained from the different trade sources, have been found satisfactory.

Such epoxides, as strong hydrochloric acid acceptors, have in common the oxirane function which can be represented as follows:

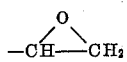

The structure for a typical low molecular weight bisphenol A/epichlorohydrin type resin can be given as:

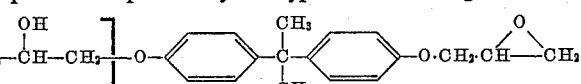

The structure for a typical phenol-formaldehyde/epichlorohydrin type polymer resin can be given as:

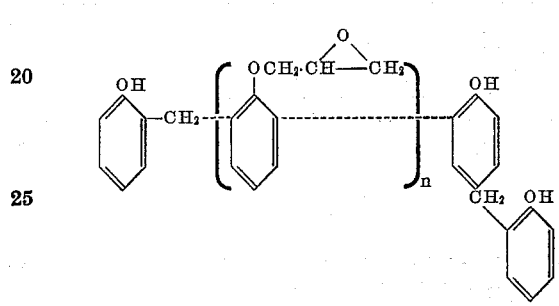

Any fat-soluble ortho-substituted azo dye may be used which has aromatic nuclei joined by one or more azo structures (N=N) and with one of the following possible radicals substituted ortho to the azo group: OH, $NO_2$, $NH_2$, COOH. Such radicals may be attached to one or two carbons ortho to the azo group. Examples of such dyes are 1-naphthylene-azo-2-naphthol (commercially available as Resinoil Brown Y Dye), 1-phenyl-azo-2-naphthylamine (commercially available as FD & C No. 3), 1-o-nitro-p-tolylazo-2-naphthol (commercially available as D & C Red No. 35).

A typical azo dye is the so-called Resinoil Brown Y Dye made by coupling B-naphthol with a-naphthyl diazonium salts.

Such azo dyes act as chelating agents, which action may be ascribed to a molecular structure by which available iron, or other metal in the reaction system, is bound strongly between the ortho substituents and the azo structure. The effect is believed to be that of firmly tying up the metal (such as iron, copper, tin, etc.) so that the free radical mechanism does not operate.

Homopolymer polyvinyl chloride can form the sole or principal component of the vinyl resin base; or this vinyl resin base can be a copolymer or vinyl chloride with smaller amounts of such mono-functional unsaturated compounds as vinyl acetate, vinylidene chloride, ethyl mono-oleate, ethyl formate, and the like. These compositions, with the corresponding other vinyl halide polymers, are referred to herein as polyvinyl halides or vinyl halide resins, as the dominant ingredient is vinyl halide in a polymer form.

Polyvinyl chloride resin is mixed with 2 percent of the epoxide resin and 0.375 percent of the azo compound, the proportions being based on the weight of the solids or non-volatile matter of the vinyl resin. Any commercially available epoxide resin of the bisphenol A-epichlorohydrin type having an epoxide equivalent of about 200 is satisfactory: a side effect of the epoxide resin is to increase the adhesion of the vinyl resin composition film to metal surfaces possibly due to the action of polar groups in the molecule.

Experience has shown that the use of unstabilized vinyl resins on plain tin surfaces is not practical due to heat degradation at normal baking temperatures of 305 degrees F. for 14 minutes, or 360 degrees F. for 1½ minutes, peak baking time being noted. The following tabulations show the improvement effected by the additives:

| Formulations | Composition No. (Parts by weight on solids basis) | | | |
|---|---|---|---|---|
| | 1 | 2 | 3 | 4 |
| VMCH Resin | 5 | 5 | 5 | 5 |
| VAGH Resin | 10 | 10 | 10 | 10 |
| VYHH Resin | 85 | 85 | 85 | 85 |
| Shell Epon 828 | | | 2 | 2 |
| Resinoil Brown Y Dye | | | 0.375 | 0.375 |

VMCH—Polyvinyl chloride and polyvinyl acetate copolymer with maleic acid.
VYHH—Polyvinyl chloride and polyvinyl acetate copolymer.
VAGH—Hydrolyzed polyvinyl chloride and polyvinyl acetate copolymer.

The results of the curing test in a circulating air oven at 360 degrees F. for 14 minutes peak bake were as follows:

FORMULA AS USED ON #25 ELECTROTIN PLATE

| Composition | Film Behavior |
|---|---|
| 1 | Excessive Burning. |
| 2 | Moderate Burning. |
| 3 | Moderate Burning. |
| 4 | No Burning. |

FORMULA AS USED ON CMQ BLACK IRON PLATE

| Composition | Film Behavior |
|---|---|
| 1 | Excessive Burning. |
| 2 | Moderate Burning. |
| 3 | Slight Burning. |
| 4 | No Burning. |

The film behavior in all these studies is based on an average film thickness of 3.5 mils.

When used on #25 Electrotin plate there was no burning when composition No. 4 was employed, namely, dye and epoxy resin together with the vinyl halide resins. When either was used separately, moderate burning of the film took place. With neither stabilizer, excessive burning was observed (composition No. 1). On this plate surface the advantage of the dye over the epoxy resin, used individually, was not significant. Also when these same compositions were cured on CMQ black iron plate, the results were essentially the same, with no burning occurring in No. 4, where both dye and epoxy resin were used. When neither were used, excessive burning was seen. Apparently the dye may be acting to complex free metal ions by chelate formation, and preventing catalytic degradation of the polyvinyl chloride resin. Stability can be satisfactorily achieved on steel surfaces by the joint action, as it is on tin plate surfaces.

The stabilizing effects of such a system is emphasized by the fact that cures were possible above the 305 degrees F. level with no burning occurring at 360 degrees F. with some formulations and appropriate time/temperature values. Successful stabilization has been achieved even at a temperature of 445 degrees F. with 5.0 percent Resinoil Brown Y Dye and 20.0 percent Epon 828.

The employment of the epoxide resin with the polyvinyl halide resins, although offering some stability, is not sufficient for can manufacturing purposes. The azo dye and vinyl resin compositions also exhibit some improvement of stability against heat degradation but not enough for can making purposes. It will be understood that increasing the quantity of the additive relative to the polyvinyl halide resin does not increase the stabilizing effect in the same relative proportion, so that such increases do not lead to satisfactory results; and in addition, larger amounts of the additive means decrease in the amount of polyvinyl halide resin present, with diminution of the desired effect of the polyvinyl resin which is the material relied upon for producing the protective coating. The azo dye and epoxy resins, however, exert a synergistic action in compounds with polyvinyl halides to increase the over-all effectiveness of the combination, which requires only small amounts of the components, e.g. 0.5 to 5.00 percent of the epoxide and 0.187 to 5.000 percent of the azo dye, on the basis of the weight of the vinyl halide resin. When the basic resin composition film preferably has the combined effects of vinyl halide and epoxy resins, e.g. for adhesion, the epoxide content can be as high as 50 percent of the weight of the vinyl halide resin.

This unique action of the azo dyes in the composite is further exemplified by other comparative tests, as shown by the following tabulations:

The basic formulas employed for these examples were as follows:

| | Composition No. (Parts by weight on solids basis) | | | |
|---|---|---|---|---|
| | 5 | 6 | 7 | 8 |
| VMCH Resin | 5 | 5 | 5 | 5 |
| VAGH Resin | 10 | 10 | 10 | 10 |
| VYHH Resin | 85 | 85 | 85 | 85 |
| Epoxy Resin (Shell 828) | 2 | 2 | 2 | 2 |
| Brown Y Dye | 0.375 | | | |
| Other Azo Dyes | | 0.375 | | |
| Non-Azo Dyes | | | 0.375 | |
| Stabilizers (Miscellaneous) | | | | 0.375 |

| Dye Used In Formula Composition | Common Name | Chemical Name or Structure |
|---|---|---|
| 5 | Sudan Brown (Resinoil Brown Y Dye). | 1-Naphthylene-azo-2-naphthol. |
| 6-1 | Methyl Red | p-Dimethyl-amino-azo-benzene-o-carboxylic-acid. |
| 6-2 | FD & C Yellow #3 | 1 - Phenyl - azo - 2 naphthylamine. |
| 6-3 | FD & C Yellow #4 | 1 - o - Tolylazo - 2 naphthylamine. |
| 6-4 | Sudan Red | Tetrazo-benzene-B-naphthol. |
| 6-5 | D & C Red #17 | 1-p-Phenyl-azo-phenylazo 2-naphthol. |
| 6-6 | D & C Red #18 | Xylylazoxylylazo-2-naphthol. |
| 6-7 | D & C Red #35 | 1-(o-Nitro-p-tolylazo) 2-naphthol. |
| 7-1 | Rhodamine B—Red | 3 Ethostearate of 9-o-carboxyphenyl-6-diethylamino-3-ethylimino-3-isoxanthene. |
| 7-2 | Methyl Cresol Purple | m-Cresolsulfonphthalein. |
| 7-3 | Quinalizarin Red | 1,2,5,8-Tetrahydroxyan-thraquinone. |
| 7-4 | D & C Green #6 | 1,4 Bis (p-toluino) anthraquinone. |
| 7-5 | D & C Red #19 | 3 Etho-chloride of 9-o-carboxyphenyl-6-diethylamino-3-ethylimino-3-isoxanthene. |
| 7-6 | D & C Red #37 | 3 Ethostearate of 9-o-carboxyphenyl-6-diethylamino-3-ethylimino-3-isoxanthene. |
| 7-7 | Safranine O—(Red) | Oxidized p-Tolylene-diamine, Aniline, and o-Toluidine. |

| Miscellaneous Stabilizers Used In Formula Composition | Common Name | Chemical Name or Synonym |
| --- | --- | --- |
| 8-1 | Azobenzene | Diphenyldiimide. |
| 8-2* | Salicylic Acid* | Same. |
| 8-3* | Urea* | Carbamide. |
| 8-4 | Lead Carbonate | Same. |
| 8-5 | Catechol | o-Dihydroxybenzene. |
| 8-6 | Diphenylamine | Same. |
| 8-7 | Sustane | Dihydroxybutylanisole. |
| 8-8 | Hydroquinone | p-Dihydroxybenzene. |
| 8-9 | Thiocarbanilide | Same. |
| 8-10 | Indole | Do. |
| 8-11 | Kojic Acid | Do. |
| 8-12 | 2,6 Ditertbutyl-p-Cresol | Do. |

*Stability of these compounds not certain in heated films.

These materials were cured in an air oven at 360 degrees F. for 14 minutes (peak bake time). When used on #25 Electrotin plate, the results were:

| Formula Compositions | Heavy Film Burning |
| --- | --- |
| 1 (Control) | Excessive Burning. |
| 5 | No Burning. |
| 6 | Do. |
| 7 | Excessive Burning. |
| 8 | Do. |

The effect of the co-presence of the epoxy resin and azo dye can also be compared with the effects of various lead and non-lead stabilizers, and of other recognized chelating agents. In the following examples, a resin mixture containing polyvinyl halide proportioned as in Formulas 5 to 8 above, was prepared with 2 parts by weight of the same epoxy resin (Shell Epon 828), and 0.375 percent (solids basis), of the following lead type stabilizers added. The coatings were then baked for 14 minutes (peak bake time) at 360 degrees F. in an air oven, with the results:

| Formula Composition | Heavy Metal Stabilizer Used | Heavy Film Burning Noted |
| --- | --- | --- |
| 5 (Brown Y Dye Control) | None | None. |
| 9-1 | Dibasic Lead Stearate | Medium. |
| 9-2 | Normal Lead Stearate | Do. |
| 9-3 | Coprecipitated Lead Orthosilicate and Silica Gel. | Excessive. |
| 9-4 | Dibasic Lead Phthalate | Do. |
| 9-5 | Basic Lead Silicate Sulfate. | Do. |
| 9-6 | Lead Chlorosilicate Complex. | Do. |
| 9-7 | Dibasic Lead Phosphite | Do. |
| 9-9 | Normal Lead Salicylate | Do. |
| 9-10 | Barium Cadmium Organic Complexes 2-3% (Used without presence of Shell Epon). | Do. |

The barium cadmium organic complexes used above were Clarite, Provinite, and Flomax 25, all products of the National Lead Company.

The synergistic effect of the azo dyes is likewise established by comparison with the effects of other metal chelating agents. Using the vinyl resin composition of Formulas 5-9 above, with 2 parts by weight of epoxy resin (Shell Epon 828) and 0.375 percent (solid basis), of the following additives, and baking for 14 minutes (peak bake time), at 360 degrees F. in an air oven, the results on a comparative scale were:

| Formula Composition | Heavy Film Burning Noted | Burn Rating |
| --- | --- | --- |
| 5 (Resinoil Brown Y Dye Control) | None | 10 |
| 10-1 | 2-Quinolinol | Slight | 9 |
| 10-2 | 2-Nitroseo-1-naphthol | do | 9 |
| 10-3 | 3-Salicylaldoxime | Medium | 8 |
| 10-4 | 1,10 Phenanthroline | do | 8 |
| 10-5 | p-Phenylazophenol | Heavy | 7 |
| 10-6 | Salicylamide | do | 6 |
| 10-7 | O-Nitrophenol | Excessive | 5 |
| 10-8 | O-Hydroxyacetophenone | do | 5 |
| 10-9 | Salicylaldehyde | do | 5 |
| 10-10 | 1-Phenyl-1, 3-butanedione | do | 3 |
| 10-11 | Salicylidene acetamide | do | 5 |
| 10-12 | 8-Quinolinol | do | 5 |
| 10-13 | 2,4-Pentanedione* | do | 4 |

*Stability of this compound not certain in heated film.

The above numerical values for "burn rating" were fixed by setting "10" as a condition of no burning, and "0" as a condition where the film was 100 percent burned over its area.

These tests show that no burning occurred on heavy films where an azo dye similar in structure to the Resinoil Brown Y Dye, or Sudan Brown, was incorporated into the film along with the epoxy resin. Where dyes not having the stated azo type structure were employed, serious burning occurred. Also where other types of compounds such as diphenylamine, lead carbonate, urea, catechol, Sustane, and hydroquinone were comparatively employed, there was excessive burning of extensive film areas.

The use of azobenzene in place of the ortho substituted azo dyes did not give stabilization, further indicating the necessity of active ortho-substituted groups on the aromatic nuclei to effect stability.

A further test on the use of epoxides, which are powerful acid acceptors, shows the importance of structure and epoxide number in heat stabilization. All the compositions represented below employed a resin mixture containing polyvinyl halide proportioned as in Formulas 5 to 8 above. To this vinyl halide resin was added 2 percent by weight of each of the following epoxide resins and 0.375% by weight of the Resinoil Brown Y Dye. The coatings were then baked on tin plate for 14 minutes at 360° F. in a circulating air oven with the following results:

| Compound | Source | Heavy Film Burn | Approx. Minimum Epoxide Equivalent Weight |
| --- | --- | --- | --- |
| 1. Styrene Oxide | Dow | Excessive | 124 |
| 2. Epon 562 | Shell | do | 140 |
| 3. Phenyl Glycidyl Ether | Dow | Serious | 150 |
| 4. Styrene - Glycidyl - Methacrylate (Copolymer). | Special [1] | None | 200 |
| 5. Resin X2633.2 | Dow | do | 173 |
| 6. Resin X2638.1 | do | do | 174 |
| 7. Epoxy 504 | Jones-Dabney | do | 170 |
| 8. Epoxy 2774 | Bakelite | do | 190 |
| 9. Epoxy 6005 | Ciba | do | 192 |
| 10. Epon 828 | Shell | do | 192 |
| 11. Epon 1001 | do | Moderate | 450 |
| 12. Epon 1004 | do | Serious | 870 |
| 13. Epon 1009 | do | Excessive | 2,400 |

[1] Synthesized in the laboratories of Continental Can Co., Inc. Not commercially available.

The superiority of either the bisphenol A/epichlorohydrin resins (5, 7, 8, 9, 10) or the phenol-formaldehyde/epichlorohydrin resins (6) over the other types of epoxides tested is evident. The relative advantage of the bisphenol A/epichlorohydrin type resins having the lowest epoxide equivalents is also exhibited. These results show that such epoxide resins having an epoxide equivalent of about 170 to 210 are required for the maximum effect. The combined additives can be stated as including a heat-stable epoxy resin with an epoxide equivalent weight in the range of 170 to 210, and an azo compound in which the azo group is joined to aromatic nuclei, these nuclei having functional ortho substituents.

The above examples of successful practice are given by way of illustration; and it will be understood that the invention is not limited thereto, within the scope of the appended claims.

What is claimed is:

1. A vinyl chloride resin composition stabilized for resistance against heat degradation during baking at 305 degrees F. for 14 minutes, including a heat-stable epoxide resin selected from the group consisting of bisphenol A/epichlorohydrin and phenol-formaldehyde/epichlorohydrin having an epoxide equivalent weight of 170 to about 210 in an amount of 0.5 to 20.0 percent by weight of the vinyl resin, and a metal chelating azo dye in an amount of 0.187 to 5.0 percent by weight of the vinyl resin, said azo dye having a structure comprising two aromatic nuclear groups each having a benzene ring and having 6 to 10 carbon atoms in the nuclear group, said groups being connected by an azo group and one group having a functional organic radical selected from the class consisting of OH, $NO_2$, $NH_2$ and COOH located in the ortho position relative to the azo connection.

2. The method of stabilizing a vinyl chloride resin composition for resistance against heat degradation during baking at 305 degrees F. for 14 minutes which comprises mixing therewith a heat-stable epoxide resin selected from the group consisting of bisphenol A/epichlorohydrin and phenol-formaldehyde/epichlorohydrin having an epoxide equivalent weight of 170 to about 210 in an amount of 0.5 to 20.0 percent by weight of the vinyl resin, and also mixing therewith a metal chelating azo dye in an amount of 0.187 to 5.0 percent by weight of the vinyl resin, said azo dye having a structure comprising two aromatic nuclear groups each having a benzene ring and having 6 to 10 carbon atoms in the nuclear group, said groups being connected by an azo group and one group having a functional organic radical selected from the class consisting of OH, $NO_2$, $NH_2$, and COOH located in the ortho position relative to the azo connection.

3. A vinyl chloride resin composition stabilized for resistance against heat degradation during baking at 305 degrees F. for 14 minutes, including a heat-stable epoxide resin selected from the group consisting of bisphenol A/epichlorohydrin and phenol-formaldehyde/epichlorohydrin having an epoxide equivalent weight of 170 to about 210 in an amount of 0.5 to 5.0 percent by weight of the vinyl resin, and a metal chelating azo dye in an amount of 0.187 to 5.0 percent by weight of the vinyl resin, said azo dye having a structure comprising two aromatic groups each having a benzene ring and having 6 to 10 carbon atoms in the nuclear group, said groups being connected by an azo group and one group having a functional organic radical selected from the class consisting of OH, $NO_2$, $NH_2$ and COOH located in the ortho position relative to the azo connection.

References Cited in the file of this patent

UNITED STATES PATENTS

| | | |
|---|---|---|
| 2,530,353 | Havens | Nov. 14, 1950 |
| 2,590,059 | Winkler | Mar. 18, 1952 |
| 2,595,619 | Voorthuis | May 6, 1952 |
| 2,719,090 | Morehead | Sept. 27, 1955 |

FOREIGN PATENTS

| | | |
|---|---|---|
| 1,042,357 | France | Oct. 30, 1953 |